United States Patent
Shao

(10) Patent No.: US 9,847,717 B1
(45) Date of Patent: Dec. 19, 2017

(54) OUTPUT VOLTAGE HOLD SCHEME FOR ULTRA LOW POWER REGULATOR

(71) Applicant: Analog Devices, Inc., Norwood, MA (US)

(72) Inventor: Bin Shao, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 14 days.

(21) Appl. No.: 15/170,180

(22) Filed: Jun. 1, 2016

(51) Int. Cl.
$H02M\ 3/157$ (2006.01)
$H02M\ 1/08$ (2006.01)

(52) U.S. Cl.
CPC ............. $H02M\ 3/157$ (2013.01); $H02M\ 1/08$ (2013.01)

(58) Field of Classification Search
None
See application file for complete search history.

(56) References Cited

U.S. PATENT DOCUMENTS

| | | | | |
|---|---|---|---|---|
| 6,498,467 B1* | 12/2002 | Stratakos | ........... | G05B 19/0428 323/282 |
| 2002/0057082 A1* | 5/2002 | Hwang | ................. | H02M 3/158 323/284 |
| 2013/0027986 A1* | 1/2013 | Atrash | .............. | H02M 3/33507 363/21.07 |
| 2013/0093407 A1* | 4/2013 | Heo | ...................... | H02M 3/156 323/290 |
| 2013/0119954 A1* | 5/2013 | Lo | ........................... | G05F 1/575 323/280 |

* cited by examiner

*Primary Examiner* — Jeffrey Gblende
(74) *Attorney, Agent, or Firm* — Schwegman Lundberg & Woessner, P.A.

(57) ABSTRACT

Apparatus and methods for providing an ultra-low power voltage converter are provided. In an example, a method can include receiving an ultra-low power command at a voltage regulator circuit from a load, disabling charge transfer of a regulator of the regulator circuit during an ultra-low power mode of operation in response to a first state of the ultra-low power command, detecting a change in the low power command or in a timeout signal, receiving an indication that the output voltage of the regulator is below a low voltage threshold in response to the change, discharging the output voltage of the regulator for a reset interval in response to the indication, and enabling charge transfer of the regulator after discharging the output voltage.

23 Claims, 6 Drawing Sheets

OUTPUT VOLTAGE HOLD SCHEME FOR ULTRA LOW POWER REGULATOR

TECHNICAL FIELD

The present disclosure relates to voltage regulation apparatus and methods.

BACKGROUND

DC-to-DC voltage regulation is useful in electronic devices, especially mobile devices that rely on a battery or similar fixed or rechargeable energy source for power. Voltage regulators can help generate steady output voltage levels from input voltage levels that can vary substantially as power is consumed from the energy source or as the energy source is being charged. Recent developments in electronic devices that rely on limited power supplies such as batteries, allow the device, or portions of the device, to transition to a low power mode when the device or portions are not needed. During such low power modes the DC-to-DC voltage regulator can become a significant power sink of the overall device, replacing the device processor as the primary power consumer.

Overview

Apparatus and methods for providing an ultra-low power voltage regulator are provided. In an example, a method can include receiving an ultra-low power command at a voltage regulator circuit from a load, disabling charge transfer of a regulator of the regulator circuit during an ultra-low power mode of operation in response to a first state of the ultra-low power command, detecting a change in the low power command or in a timeout signal, receiving an indication that the output voltage of the regulator is below a low voltage threshold in response to the change, discharging the output voltage of the regulator for a reset interval in response to the indication, and enabling charge transfer of the regulator after discharging the output voltage.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized apparatus and methods that allow a regulator to hold or cease voltage regulation processes during times when a load is in a low-power mode thus allowing for ultralow-power operation of an electronic device. In certain examples, the regulation processes can be re-started by the load, for example, when the load exits the low power mode. In some examples, a regulator ultra-low power mode controller can receive a low-power request signal from the load and can verify operational integrity of the signal as the signal transitions between requesting ultralow-power mode and removing a request for ultralow-power mode. In certain examples, when a transition of the low-power request signal indicates that the load, such as a controller, may have passed into an unstable or locked up state, the regulator ultra-low power mode controller can command a switch to discharge a supply node of a load for a reset interval and then enable the regulation processes to provide regulated voltage and power to the load. Such discharge is designed to assure that the load resets or restarts to a predictable, stable state.

Figure 1:
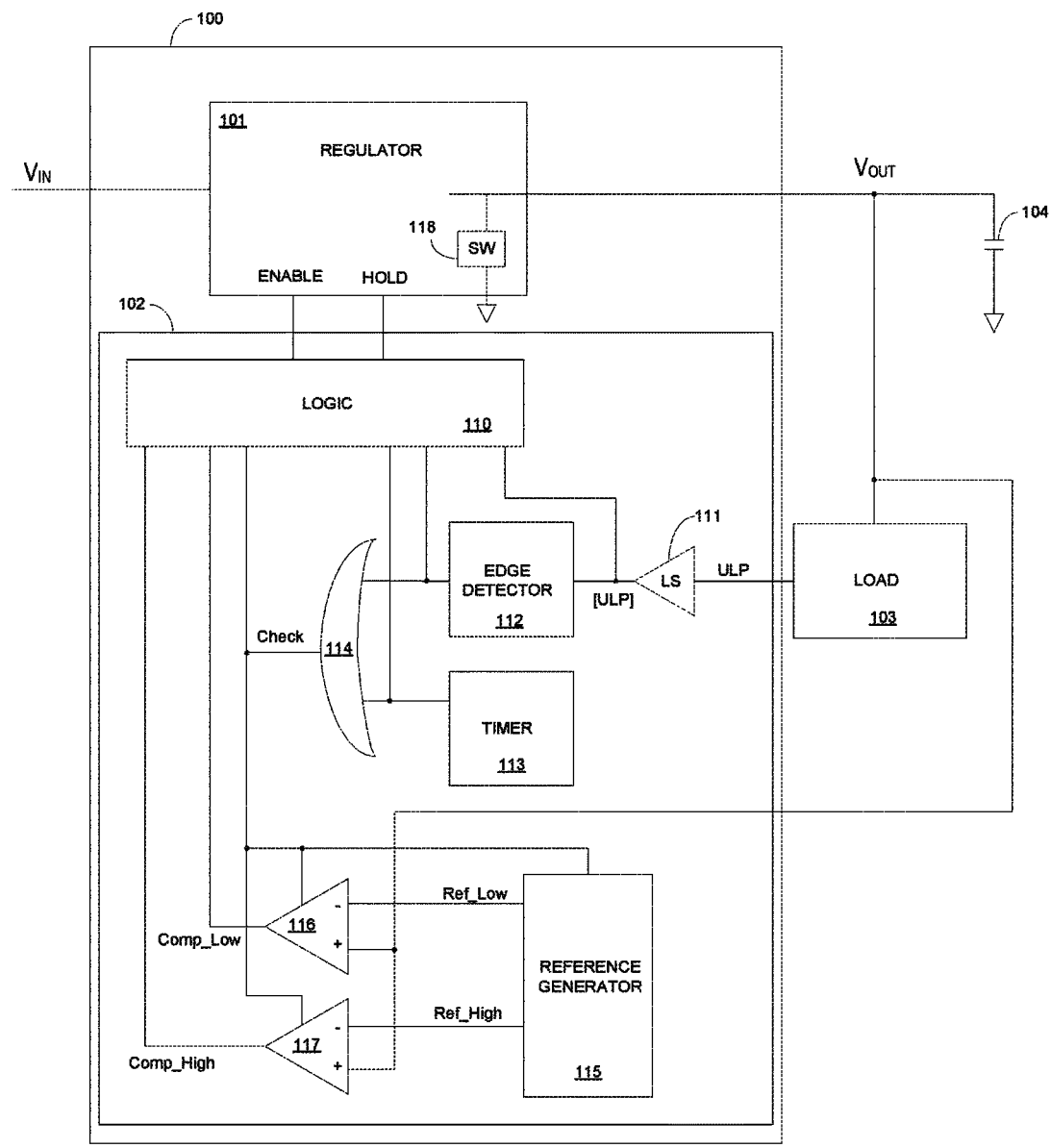
FIG. 1 illustrates generally a regulator circuit according to an example of the present subject matter.

FIG. 1 illustrates generally a regulator circuit 100 or system according to an example of the present subject matter. The regulator circuit 100 can include a regulator 101 and a regulator control circuit 102 providing a supply or output voltage (Vout) to a load 103 and to an optional output capacitor 104. In certain examples, the regulator 101 can receive an input supply voltage (Vin), such as an input supply voltage from a limited energy source such as a battery or a capacitor. Since the voltage of the input supply can vary, for example, depending on the charge state of a battery, the regulator 101 can convert or regulate the input power supply (Vin) to a desired output voltage (Vout). A logic circuit 110 of the regulator control circuit 102 can control the regulator 101 using an enable control signal (Enable), a hold control signal (Hold) or both an enable control signal (Enable) and a hold control signal (Hold). The logic circuit 110 can control the state of the enable control signal (Enable) or the hold control signal (Enable) using inputs received from additional control components of the regulator control circuit 102.

In certain examples, the additional control components can include an optional level shifter 111, an edge detector 112, a timer 113, a check gate 114, a reference generator 115 and one or more voltage comparators 116, 117. In certain examples, the regulator control circuit 102 can be referenced to the input voltage (Vin) and the optional level shifter 111 can receive an input signal referenced to the output voltage (Vout), such as an ultra-low-power mode command signal (ULP) from the load 103, and can shift the signal to an appropriate signal level referenced to the input voltage (Vout).

In certain examples, the regulator circuit 100 can include a switch 118 for discharging the output voltage ($V_{OUT}$) of the regulator 101. In some examples, the switch 118 can be part of the regulator 101 as shown in FIG. 1. In some examples, the switch 118 can be part of the regulator control circuit 102. In certain examples, the switch 118 can include, but is not limited to, a transistor.

In certain examples, the additional control components such as the edge detector 112, the reference generator 115 and the voltage comparators 116, 117 can provide status signals to the logic circuit 110 such that the logic circuit 110 can determine, at each transition of the ultra-low-power mode command signal (ULP) from the load, whether the signal has integrity or not. Examples of such determinations are described in more detail below. As a back-up, the additional control components can also include the timer 113 with a preset that can allow the logic circuit 110 to restart operation of the regulator 101 from an ultra-low power mode when the load 103 fails to do so in a timely manner.

When the load is performing nominal load condition operations, the regulator 101 can be enabled to supply one or more regulated supply or output voltages (Vout) to the load 103. One or more optional output capacitors 104 can assist in smoothing the regulated output voltages (Vout) especially when an occasional load current spike or short term load increase occurs. During times when load activity and current demand is low, the load 103 can provide a signal to change the operation of the regulator 101 to an ultra-low-power mode. In ultra-low-power mode, the logic circuit 110 can maintain the enabled state of the enable control signal and can transition the hold signal to a hold state.

Figure 2:
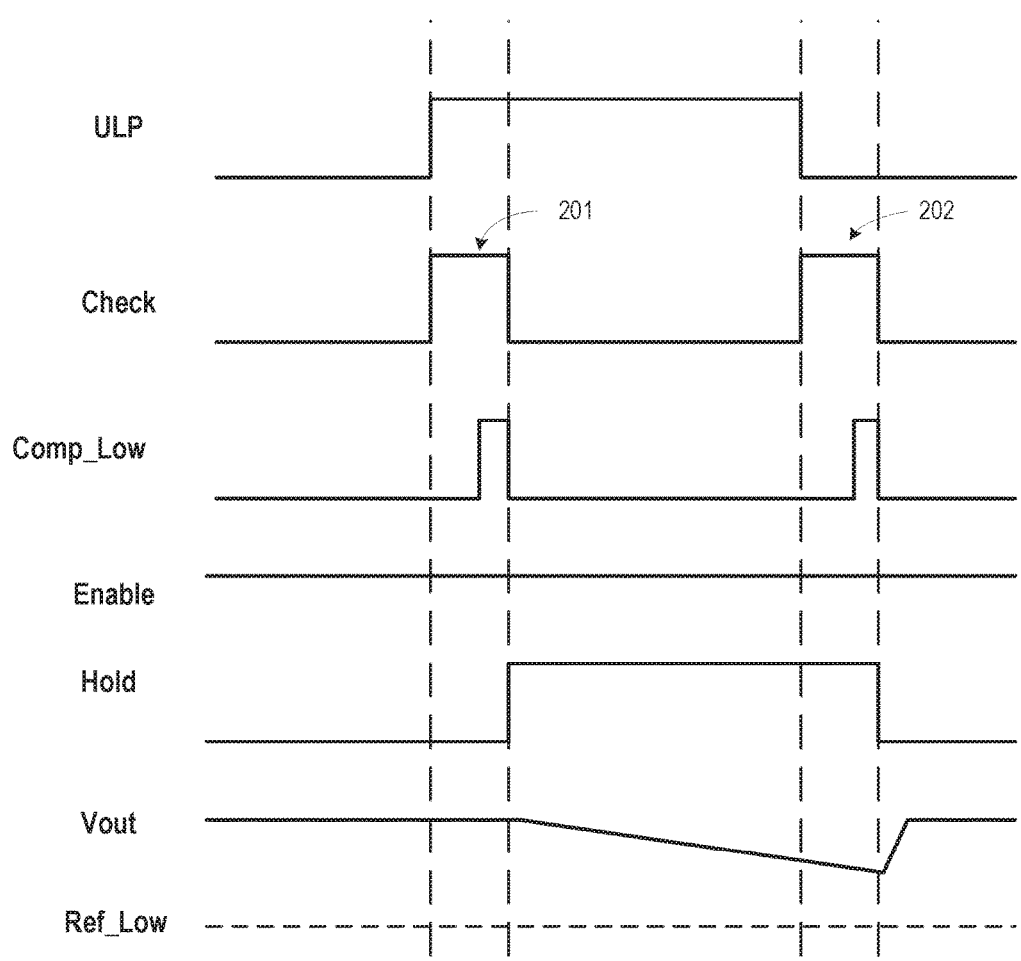
FIG. 2 illustrates generally a timing diagram of signals of an example regulator circuit as the regulator transitions into and out of an ultra-low-power mode responsive only to an ultra-low-power command signal received from the load.

FIG. 2 illustrates generally a timing diagram 200 of signals of an example regulator circuit as the regulator transitions into and out of an ultra-low-power mode responsive only to an ultra-low-power command signal received from the load. The timing diagram 200 illustrates six signals received by the regulator control circuit, generated internal to the regulator control circuit, generated and output from the regulator control circuit or generated by the regulator 101. The regulator 101 can generate an output voltage (Vout). The ultra-low-power command (ULP) signal can be received from a load 103 that is powered by the output voltage (Vout) of the regulator 101. Although not limited as such, in FIG. 2, a high signal level of the ULP signal can indicate a command for the regulator circuit 100 to enter an ultra-low power mode of operation. A low signal level of the ULP signal can indicate a command to exit the ultra-low power mode. The check signal (Check) can be internally generated by the regulator control circuit and can indicate a transition of the ULP or a timeout signal (not shown). The regulator control circuit 102 can internally generate one or more reference signals and one or more comparator signals based on those reference signals. In an example, the regulator control circuit 102 can internally generate a first reference signal (Ref_Low) and a first comparator signal (Comp_Low). A first comparator 116 of the regulator control circuit 102 can receive the first reference signal (Re_Low) and compare it to a representation of the output voltage (Vout) of the regulator. The output of the comparator 116, or the first comparator signal (Comp_Low) can be indicative of whether the output voltage (Vout) is above or below a low reference level indicated by the first reference signal (Ref_Low).

The regulator control circuit 102 can control the operation of the regulator 101 using one or both of the hold signal (Hold) and the enable signal (Enable). As discussed above, when the hold signal (Hold) is in a first state, the regulator 101 can provide charge to the load 103 and an optional output capacitor 104. When the hold signal (Hold) is in a second state, the regulator 101 can cease providing charge to the load 103 and the optional output capacitor 104, and subsequent energy used by the load 103 can be supplied by stored energy such as the stored energy of the load 103 or stored energy of the optional output capacitor(s) 104. When the enable signal (Enable) is in a first state, the regulator 101 is capable of providing charge from an input supply ($V_{IN}$) to the load 103 at a desired output voltage ($V_{OUT}$). Whether charge is actually provided to the output of the regulator 101 can depend on the state of the hold signal (Hold). When the enable signal (Enable) is in a second state, the regulator 101 can cease providing charge to the output of the regulator 101 and will discharge energy at the output of the regulator 101, for example, to ground.

Referring again to FIG. 2, as well as the circuit elements of FIG. 1 as an example, upon a transition of the ULP signal from a low signal level to a high signal level, indicative of the load 103 requesting ultra-low power mode of the regulator circuit 100, the edge detector 112 can provide an edge detection pulse (not shown). In certain examples, the check gate 114 can provide a first check pulse 201 of a check signal (Check) in response to an output pulse of the edge detector 112. The first check pulse 201 can power-up a reference generator 115 and one or more comparators 116, 117. For the transition of the ULP from low state to a high state, the output state of the second comparator 117, a high voltage level comparator, may not be relevant. The output state of the first comparator 116, a low output voltage comparator, can provide verification that a transition to the ultra-low power mode is valid. In certain examples, the first check pulse 201 can have pre-determined duration to allow the reference generator 115 providing reference voltages (Ref_High_, Ref_Low) to the first and second comparators 116, 117, as well as the comparators 116, 117, to power up and provide proper signals. Such examples, allow for even lower power operation compared to examples that may keep one or more of the reference generator or the comparators powered on outside the times the comparator outputs are evaluated. Upon evaluation that the output voltage is above a low voltage threshold, via the first comparator 116, the control circuit can command the regulator 101 into a hold mode of operation via the hold command signal (Hold).

Upon a transition of the ULP signal from a high signal level to a low signal level, indicative of the load 103 requesting the regulator circuit 100 to exit the ultra-low power mode, the edge detector 112 can provide an edge detection pulse (not shown). The check gate 114 can provide a second check pulse 202 in response to the second output pulse of the edge detector 112. The second check pulse 202 can power-up the reference generator 115 and the one or more comparators 116, 117. The output state of the first comparator 116, a low output voltage comparator, can provide an indication of whether the load has made a valid request. In the situation illustrated in FIG. 2, the request is valid. Upon evaluation that the output voltage ($V_{OUT}$) is above the low voltage threshold, via the first comparator 116, the regulator control circuit 102 can command the regulator 101 to exit the hold mode of operation via the hold command signal (Hold) and the regulator 101 can operate to bring the output voltage ($V_{OUT}$) back to a desired level.

Figure 3:
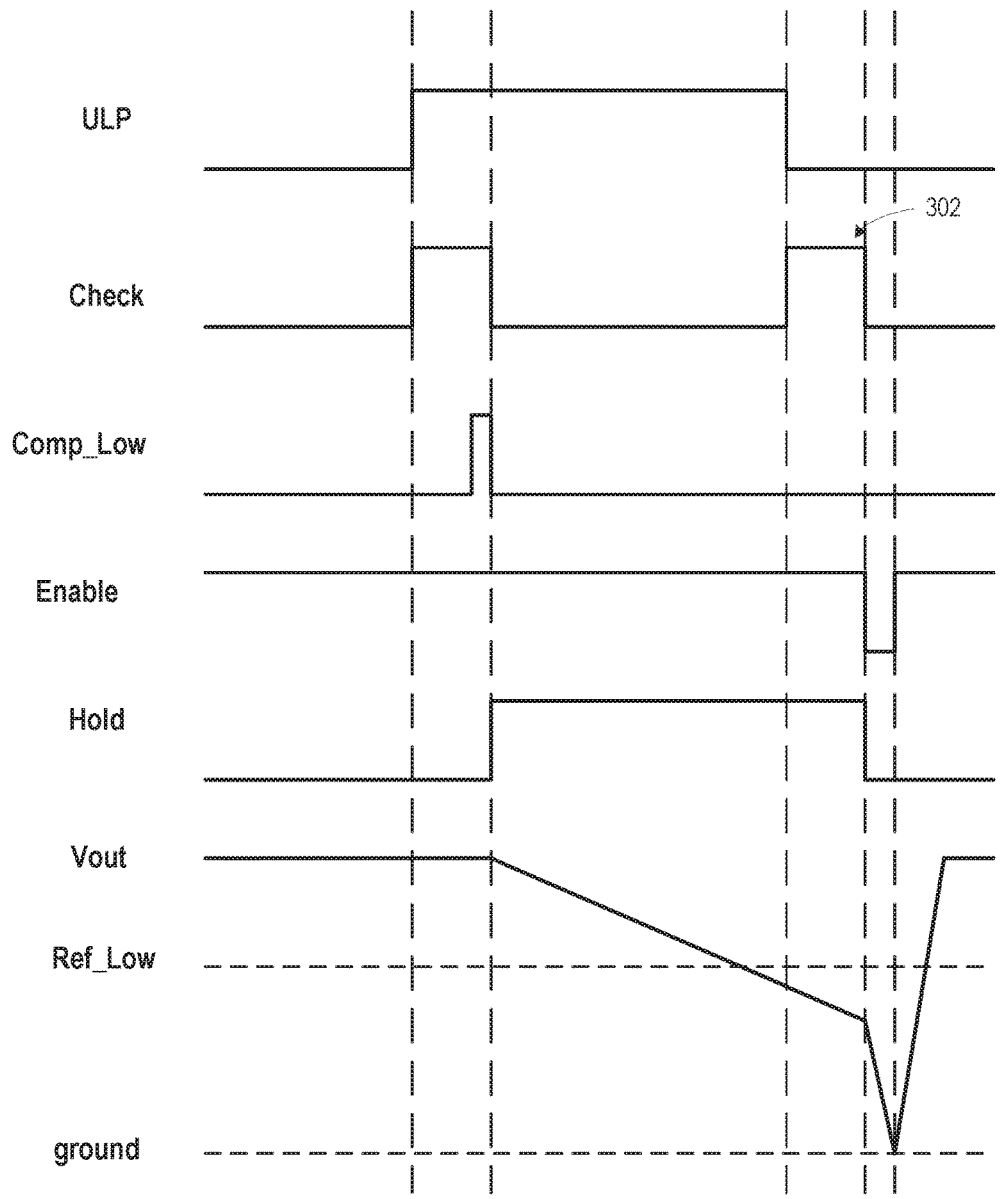
FIG. 3 illustrates operation of the regulator control circuit when the load consumes more power than anticipated during an ultra-low power cycle.

FIG. 3 illustrates operation of the regulator control circuit 102 when the load 103 consumes more power than anticipated during an ultra-low power cycle. The operation of the regulator control circuit 102 upon entering the ultra-low power mode is the same as described above with reference to FIG. 2. Upon a transition of the ULP signal from a high signal level to a low signal level, indicative of the load 103 requesting the regulator circuit 100 exit the ultra-low power mode, the edge detector 112 can provide an edge detection pulse (not shown) to an input of the check gate. The check gate 114 can provide a second check pulse 302 of the check signal (Check) in response to a second output pulse of the edge detector 112. The second check pulse 302 can power-up the reference generator 115 and the one or more comparators 116, 117. The output state of the first comparator 116, a low output voltage comparator, can provide an indication of whether the load 103 has made a valid request. In the situation illustrated in FIG. 3, the output voltage ($V_{OUT}$) has fallen to level below the low voltage reference (Ref_Low) indicative of the load 103 using more power than anticipated during the ultra-low power mode or that the load 103 has locked up and the ULP signal has transitioned to a low state due to the falling output voltage. Upon evaluation that the output voltage is below the low voltage threshold, via the first comparator 116, the regulator control circuit 102 can command the regulator 101 to momentarily disable via the enable command signal (Enable) and to exit the hold mode of operation via the hold command signal (Hold). In certain examples, the low voltage threshold or the low voltage reference (Ref_Low) may be referred to as a reset threshold. During the momentary disabling of the regulator 101, the output voltage is discharged, for example to ground. Upon re-enabling the regulator 101, the load 103 can power-up fresh to a predetermined state. Thus, the transition of the enable command signal (Enable) allows the output voltage to be discharged and the load to predictably be reset. By comparison, if the load had "locked-up" and upon exit of the ultra-low power mode, the regulator circuit had merely raised the output voltage, it is quite possible the load would remain locked up. Further, as the output voltage rises, the ULP output from the locked up load may again request ultra-low power mode and the cycle repeats. Thus, the disabling of the regulator and discharge of the output voltage provides substantial certainty that the load is reset and restarts as designed to a known state.

Figure 4:
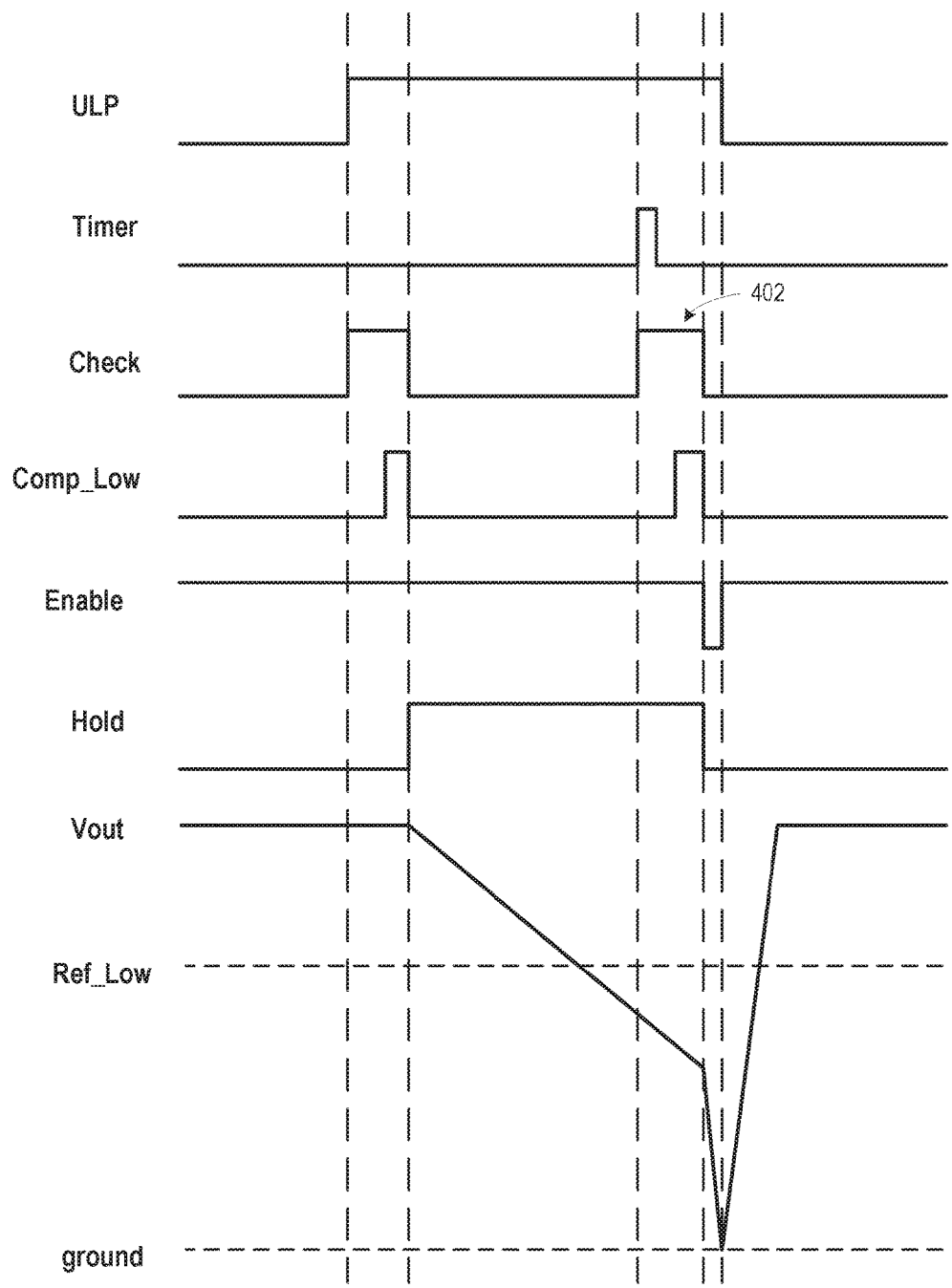
FIG. 4 illustrates generally operation of a regulator circuit including a timer.

FIG. 4 illustrates generally operation of a regulator circuit 100 including a timer 113, such as a watchdog timer. In the illustrated example, the regulator circuit 100 and load 103 can be designed to have very predictable duration of low-power operation and the load 103 can be designed to control entry and exit of ultra-low power operation of the regulator 101 via the ULP signal. The timer 113 is designed with a delay that is longer that the predictable duration of low-power operation and with a delay that should result in the output voltage falling below the low voltage reference.

Referring to FIG. 4, the operation of the regulator control circuit 102 upon entering the ultra-low power mode is the same as described above with reference to FIG. 2. In the scenario illustrated generally in FIG. 4, the load 103 has failed to perform as designed and maintains the LIP in a state that commands the regulator 101 to operate in the ultra-low power mode longer than the predictable duration discussed above and also longer than the delay of the timer 113. As the timer 113 expires, it provides a pulse, or timeout signal, to the check gate 114. The check gate 114 can provide a second check pulse 402 of the check signal (Check) in response to the second output pulse of the edge detector 112. The second check pulse 402 can power-up the reference generator 115 and the one or more comparators 116, 117. In the situation illustrated in FIG. 4, the output voltage ($V_{OUT}$), or a representation thereof, has fallen to level below the low voltage reference (Ref_Low) indicative that the load 103 has locked up or had some other malfunction that did not allow the load 103 to exit the ultra-low power mode after the predicted duration. Upon evaluation that the output voltage ($V_{OUT}$) is below the low voltage threshold, via the first comparator 116, the regulator control circuit 102 can command the regulator 101 to momentarily disable via the enable command signal (Enable) and to exit the hold mode of operation via the hold command signal (Hold). During the momentary disabling of the regulator 101, the output voltage ($V_{OUT}$) can be discharged, for example to ground. Upon re-enabling the regulator 101, the load 103 can power-up fresh to a predetermined state. Thus, the transition of the enable command signal (Enable) allows the output voltage ($V_{OUT}$) to be discharged and the load 103 to predictably be reset. By comparison, if the load 103 had "locked-up" and upon exit of the ultra-low power mode, the regulator 101 had merely raised the output voltage ($V_{OUT}$), it is quite possible the load 103 would remain locked up. Further, as the output voltage rises, the ULP output from the locked up load may again request ultra-low power mode and the cycle repeats. Thus the disabling of the regulator and discharge of the output voltage provides substantial certainty that the load is reset and restarts as designed to a known state.

Figure 5:
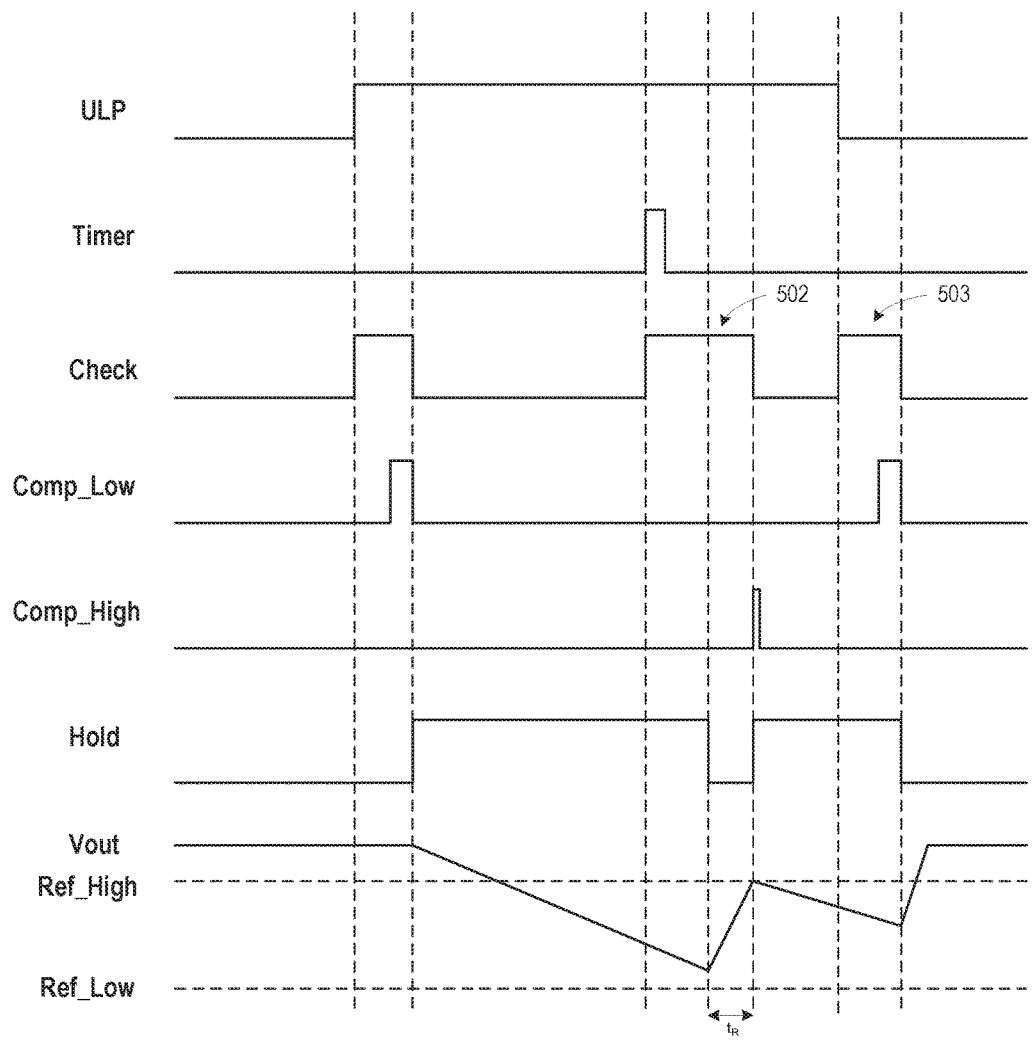
FIG. 5 illustrates generally an alternative function for a regulator circuit including a timer according to various examples of the present subject matter.

FIG. 5 illustrates generally an alternative function for a regulator circuit 100 including a timer 113 according to various examples of the present subject matter. Such an alternative function can be implemented in loads that do not have a predictable duration for operation in an ultra-low power mode. The operation of the regulator control circuit 102 upon entering the ultra-low power mode is the same as described above with reference to FIG. 2. Upon expiration of the timer 113 during ultra-low power mode operation of the regulator 101, the timer 113 can provide a pulse, or timeout signal, to the check gate 114. The check gate 114 can provide a second check pulse 502 of the check signal (CHECK) in response to the pulse provided by the timer 113. The second check pulse 502 can power-up the reference generator 115 and the one or more comparators 116, 117. If the first comparator 116 indicates that the output voltage ($V_{OUT}$), or a representation thereof, has fallen below the representation of the low voltage reference, the load 103 is reset by discharging the regulator 101 as discussed above with reference to FIGS. 3 and 4. In the situation illustrated in FIG. 5, the output voltage ($V_{OUT}$) has fallen but to level between the high voltage reference (Ref_High) and the low voltage reference (Ref_Low). In response to the outputs of both the first comparator 116 indicating the output voltage is above a low voltage threshold and the second comparator 117 indicating the output voltage is below a high voltage threshold, the regulator control circuit 102 can command the regulator 101 to exit the ultra-low power mode via the hold command signal (HOLD) and build the output voltage ($V_{OUT}$) up until the second comparator 117 indicates the output voltage ($V_{OUT}$) is at least at the high voltage threshold. When the output voltage ($V_{OUT}$) rises and triggers the second comparator 117, the regulator control circuit 102 can command the regulator 101 to again enter the hold mode of operation. As such, the timer 113 can be used to refresh the charge stored in the output capacitor 104 or the load 103 during ultra-low mode operation. In some examples, instead of using a second comparator 117, the regulator control circuit 102 can use an optional refresh interval timer (not shown) to have the regulator raise the output voltage ($V_{OUT}$) for an optional predetermined refresh interval ($t_R$).

Upon a transition of the ULP signal from a high signal level to a low signal level, indicative of the load 103 requesting the regulator circuit 100 exit the ultra-low power mode, the edge detector 112 can provide an edge detection pulse (not shown). The check gate 114 can provide a third check pulse 503 of the check signal (Check) in response to the output pulse of the edge detector 112. The third check pulse 503 can power-up the reference generator 115 and the one or more comparators 116, 117. The output state of the first comparator 116, a low output voltage comparator, can provide an indication of whether the load has made a valid request. In the situation illustrated in FIG. 5, the request is valid. Upon evaluation that the output voltage ($V_{OUT}$) is above the low voltage threshold, via the first comparator 116, the control circuit can command the regulator to exit the hold mode of operation via the hold command signal (Hold) and the regulator can operate to bring the output voltage ($V_{OUT}$) back to a desired level.

Figure 6:
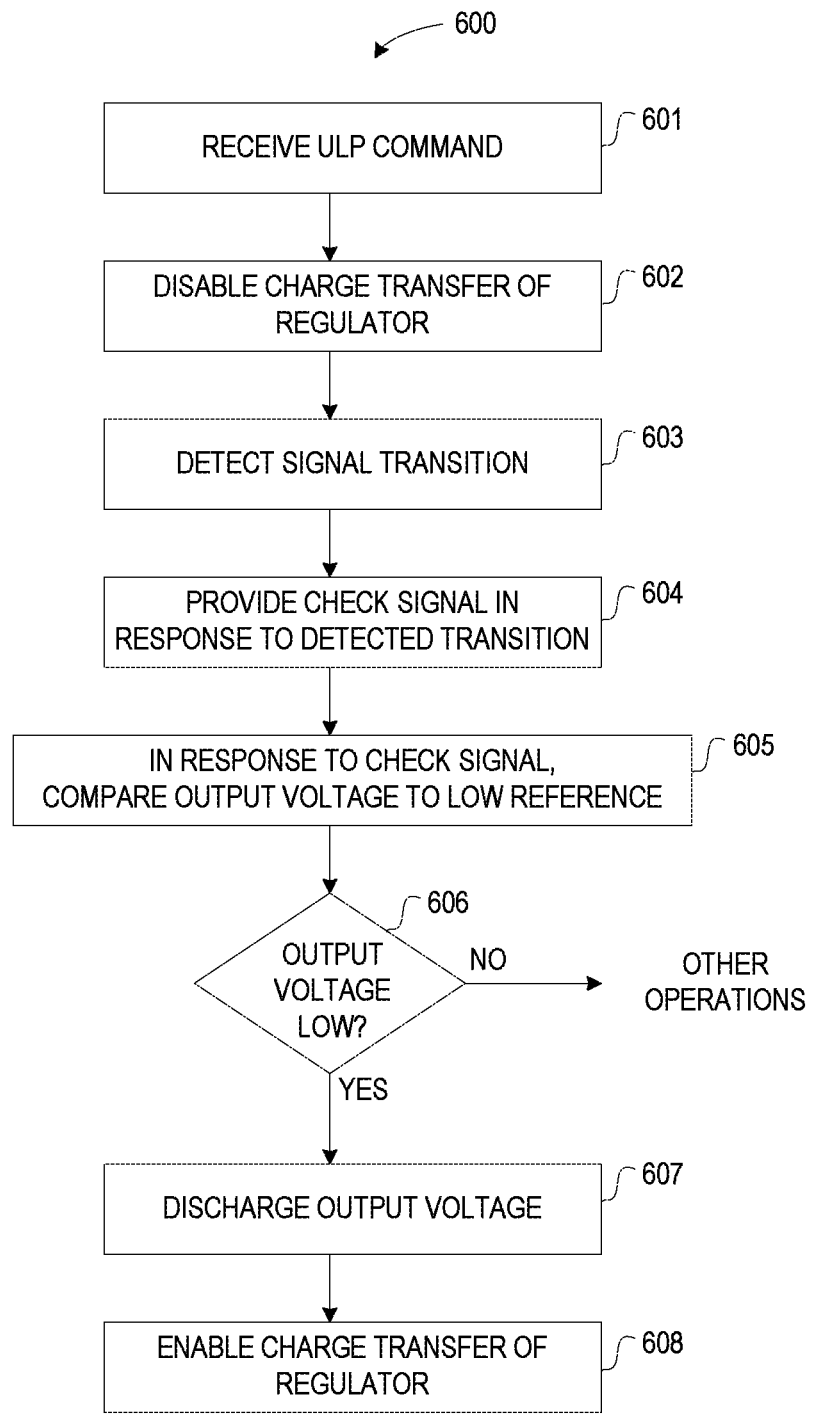
FIG. 6 illustrates a flow chart of a method for controlling a regulator having an ultra-low power mode.

FIG. 6 illustrates a flow chart of a method for controlling a regulator having an ultra-low power mode. At 601, a voltage regulator circuit can receive an ultra-low power command signal from a load. In certain examples, the load can include an electronic device including a mobile electronic device such as a mobile phone, mobile computer, wearable electronic device or other mobile communication devices. At 602, regulation functionality of a voltage regulator of the voltage regulator circuit can be placed in a hold condition. In certain examples, a regulator controller can receive the ultra-low power command and can control the operation of the voltage regulator. In certain examples, a hold condition can include ceasing regulation of an output voltage of the voltage regulator or disabling charge transfer from a power supply source to the output of the voltage regulator, such that subsequent power for the load is drawn from energy stored in the load or energy stored in an output capacitor coupled to the load. At 603, the regulator control circuit can detect a transition of the ultra-low power command signal or optionally a transition of a timeout signal of a timer of the voltage regulator circuit. In some situations, a transition of the ultra-low power command can indicate the load is exiting a low-power mode and is commanding the regulator circuit to cease operating in an ultra-low power mode. In some situations, a transition of the ultra-low power command or a transition of an optional timeout signal of a timer can indicate that operation of the load, such as a processor, has become unstable. In certain examples, the transition can be detected using an edge detector circuit that can generate a predetermined duration pulse upon detection of a signal edge.

At 604, a check signal or a check pulse can be generated by a regulator control circuit in response to detection of the transition. In certain examples, a gate such as an OR gate circuit can be used to generate the check pulse. In some examples, in addition to initiating certain comparing operations, the check pulse can also be used to supply power to components used to execute the comparing operations. At 605, in response to the check pulse, a comparator can compare a low voltage reference and a representation of the output voltage of the voltage regulator and can provide an indication of the comparison. In certain examples, the check pulse can be used to power the comparator. In some examples, the check pulse can be used to power a reference generator that provides the low voltage reference. In some examples, the check pulse can power one or more comparators and the reference generator. At 606, if the representation of the output voltage is below the low voltage threshold, the output voltage of the regulator circuit can be discharged and at 608, the charge transfer of the regulator can be enabled. Discharging the output voltage can assure that the load is completely powered off such that as the voltage regulator provides sufficient power and output voltage, the load will boot in a predictable sequence to a stable state of operation. Such a combination of actions, discharge power and restart may be referred to as a "hard reset" of the load.

Various Notes & Examples

In Example 1, a regulator system can include a voltage regulator configured to receive input voltage and provide an output voltage to a load at a desired level when the regulator is enabled, and a regulator control circuit configured to receive an ultra-low power command signal from the load, to disable a charge transfer function of the voltage regulator responsive to a first state of the low-power signal of the load, to detect a change of the low-power signal or a timeout signal, to compare a representation of the output voltage level to a reset threshold in response to the change, to discharge the output voltage for a reset period if a comparison of the representation of the output voltage level with the reset threshold indicates the representation of the output voltage level is below the reset threshold, and to enable the charge transfer function of the voltage regulator after the output voltage is discharged.

In Example 2, the regulator system of Example 1 optionally includes a timer configured to provide the timeout signal.

In Example 3, the regulator system of any one or more of Examples 1-2 optionally includes a switch configured to discharge the output voltage.

In Example 4, the regulator control circuit of any one or more of Examples 1-3 optionally includes a level shifter, the level shifter configured to receive the ultra-low power command signal referenced to the output voltage and to provide a level-shifted ultra-low power command signal referenced to the input voltage.

In Example 5, the regulator system of any one or more of Examples 1-4 optionally includes a check gate configured to receive the level-shifted, ultra-low power command signal and to provide check signal.

In Example 6, the regulator control circuit of any one or more of Examples 1-5 optionally includes a reference generator configured to provide the reset threshold.

In Example 7, the check signal of any one or more of Examples 1-6 optionally is configured to provide power to the reference generator.

In Example 8, the regulator control circuit of any one or more of Examples 1-7 optionally includes a low output voltage comparator configured to compare to compare the representation of the output voltage level to the reset threshold.

In Example 9, the check signal of any one or more of Examples 1-8 optionally is configured to provide power to the low output voltage comparator.

In Example 10, the regulator control circuit of any one or more of Examples 1-9 optionally includes a high output voltage comparator, the high voltage comparator configured to provide an indication when the representation of the output voltage is above a high voltage reference provided by the reference generator, and the check signal is optionally configured to provide power to the high output voltage comparator.

In Example 11, a method for controlling a regulator circuit can include receiving an ultra-low power command at a voltage regulator from a load, disabling charge transfer of a regulator of the regulator circuit during an ultra-low power mode of operation in response to a first state of the ultra-low power command, detecting a change in the low power command or in a timeout signal, receiving an indication that the output voltage of the regulator is below a low voltage threshold in response to the change, discharging the output voltage of the voltage regulator for a reset interval in response to the indication, and enabling charge transfer of the regulator after discharging the output voltage.

In Example 12, the method of any one or more of Examples 1-11 optionally includes initiating a timer interval upon disabling the charge transfer function of the regulator, and changing a state of the timeout signal provided by the timer at the conclusion of the timer interval.

In Example 13, the receiving the ultra-low power command of any one or more of Examples 1-12 optionally includes level shifting an ultra-low power command signal from a first level referenced to the output voltage to a second level referenced to the input voltage.

In Example 14, the detecting a change of the low power command or in a timeout signal of any one or more of Examples 1-13 optionally includes detecting a transition of the ultra-low power command using an edge detector and providing a detection pulse to a check gate.

In Example 15, the detecting a change of the low power command or in a timeout signal of any one or more of Examples 1-2 optionally includes providing check pulse from an output of the check gate in response to the detection pulse.

In Example 16, the providing the indication of any one or more of Examples 1-15 optionally includes providing a low output voltage reference from a reference generator, the low output voltage reference indicative of the low-voltage threshold.

In Example 17, the providing the indication of any one or more of Examples 1-16 optionally further includes powering the reference generator from the check pulse.

In Example 18, the providing the indication of any one or more of Examples 1-17 optionally includes comparing the low-voltage reference to a representation of the output voltage using a first comparator.

In Example 19, the providing the indication of any one or more of Examples 1-18 optionally includes providing power to the first comparator from the check pulse.

In Example 20, a regulator control circuit configured to couple to a voltage regulator, the voltage regulator configured to provide an output voltage using charge transferred from an input voltage when a hold command signal is in a first state, to cease transferring charge when the hold command signal is in a second state, and to discharge the output voltage when an enable signal is in a disable state can include an edge detector configured to receive an ultra-low power mode (ULP) signal from a load configured to receive the output voltage, a check gate responsive to an output of the edge detector to provide a check pulse, a voltage comparator circuit responsive to the check pulse and configured to provide an output signal in a first state when a representation of the output voltage is below a low voltage reference and to provide the output signal in a second state when the representation of the output voltage is not below the low voltage reference, and control logic configured to receive the ULP signal, the check signal and the output signal, to transition the hold command signal from the first state to the second state when the ULP signal is in a low-power mode state and the output signal is in the second state, and to transition the enable signal to the disable state in response the first state of the output signal.

In Example 21, the regulator control circuit of any one or more of Examples 1-20 optionally includes a timer configured to initiate timing an interval, the initiation responsive to the low-power mode state of the UP signal, and to provide a timeout pulse to the check gate at a conclusion of the interval.

In Example 22, the regulator control circuit of any one or more of Examples 1-21 optionally includes a reference generator configured to receive power from the check pulse and to provide the low voltage reference.

In Example 23, the voltage comparator circuit of any one or more of Examples 1-22 optionally is configured to receive power from the check pulse.

Example 24 can include, or can optionally be combined with any portion or combination of any portions of any one or more of Examples 1 through 23 to include, subject matter that can include means for performing any one or more of the functions of Examples 1 through 23, or a machine-readable medium including instructions that, when performed by a machine, cause the machine to perform any one or more of the functions of Examples 1 through 23.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A regulator system comprising:
a voltage regulator configured to receive an input voltage and provide an output voltage to a load at a desired level when the voltage regulator is enabled;
a regulator control circuit configured to receive an ultra-low power command signal from the load, to disable a charge transfer function of the voltage regulator responsive to a first state of the ultra low-power command signal of the load, to detect a change of the ultra low-power command signal or a timeout signal, to compare a representation of the output voltage level to a reset threshold in response to the change, to discharge the output voltage for a reset period if a comparison of the representation of the output voltage level with the reset threshold indicates the representation of the output voltage level is below the reset threshold, and to enable the charge transfer function of the voltage regulator after the output voltage is discharged.

2. The regulator system of claim 1, including a time configured to provide the timeout signal.

3. The regulator system of claim 1, including a switch configured to discharge the output voltage.

4. The regulator system of claim 1, wherein the regulator control circuit includes a level shifter, the level shifter configured to receive the ultra-low power command signal referenced to the output voltage and to provide a level-shifted ultra-low power command signal referenced to the input voltage.

5. The regulator system of claim 4, including a check gate configured to receive the level-shifted, ultra-low power command signal and to provide a check signal.

6. The regulator system of claim 5, wherein the regulator control circuit includes a reference generator configured to provide the reset threshold.

7. The regulator system of claim 6, wherein the check signal is configured to provide power to the reference generator.

8. The regulator system of claim 5, wherein the regulator control circuit includes a low output voltage comparator configured to compare the representation of the output voltage level to the reset threshold.

9. The regulator system of claim 8, wherein the check signal is configured to provide power to the low output voltage comparator.

10. The regulator system of claim 9, wherein the regulator control circuit includes a high output voltage comparator, the high voltage comparator configured to provide an indication when the representation of the output voltage is above a high voltage reference provided by the reference generator; and
wherein the check signal is configured to provide power to the high output voltage comparator.

11. A method for controlling a regulator circuit, the method comprising:
receiving an ultra-low power command at the regulator circuit from a load;
disabling a charge transfer function of a regulator of the regulator circuit during an ultra-low power mode of operation in response to a first state of the ultra-low power command;
detecting a change in the ultra low power command or in a timeout signal;
receiving an indication that the output voltage of the regulator is below a low voltage threshold in response to the change;
discharging the output voltage of the voltage regulator for a reset interval in response to the indication; and
enabling the charge transfer function of the regulator after discharging the output voltage.

12. The method of claim 11, including initiating a timer interval upon disabling the charge transfer function of the regulator; and
changing a state of the timeout signal provided by the timer at a conclusion of the timer interval.

13. The method of claim 11, wherein the receiving the ultra-low power command includes level shifting an ultra-low power command signal from a first level referenced to the output voltage to a second level referenced to the input voltage.

14. The method of claim 13, wherein detecting the change of the ultra low power command or in a timeout signal includes detecting a transition of the ultra-low power command using an edge detector and providing a detection pulse to a check gate.

15. The method of claim 14, wherein detecting the change of the ultra low power command or in a timeout signal further includes providing check pulse from an output of the check gate in response to the detection pulse.

16. The method of claim 15, wherein the providing check pulse includes providing a low output voltage reference from a reference generator, the low output voltage reference indicative of the low-voltage threshold.

17. The method of claim 16, wherein the providing check pulse further includes powering the reference generator from the check pulse.

18. The method of claim 16, wherein the providing check pulse includes comparing the low-voltage threshold to a representation of the output voltage using a first comparator.

19. The method of claim 18, wherein the providing check pulse includes providing power to the first comparator from the check pulse.

20. A regulator control circuit configured to couple to a voltage regulator, the voltage regulator configured to provide an output voltage using charge transferred from an input voltage when a hold command signal is in a first state, to cease transferring charge when the hold command signal is in a second state, and to discharge the output voltage when an enable signal is in a disable state, the regulator control circuit comprising:

an edge detector configured to receive an ultra-low power mode (ULP) signal from a load configured to receive the output voltage;

a check gate responsive to an output of the edge detector to provide a check pulse;

a voltage comparator circuit responsive to the check pulse and configured to provide an output signal in a first state when a representation of the output voltage is below a low voltage reference and to provide the output signal in a second state when the representation of the output voltage is not below the low voltage reference; and control logic configured to receive the ULP signal, the check signal and the output signal, to transition the hold command signal from the first state to the second state when the ULP signal is in a low-power mode state and the output signal is in the second state, and to transition the enable signal to the disable state in response the first state of the output signal.

21. The regulator control circuit of claim 20, including a timer, the timer configured to initiate timing an interval, the initiation responsive to the low-power mode state of the ULP signal, and to provide a timeout pulse to the check gate at a conclusion of the interval.

22. The regulator control circuit of claim 20, including a reference generator configured to receive power from the check pulse and to provide the low voltage reference.

23. The regulator control circuit of claim 20, wherein the voltage comparator circuit is configured to receive power from the check pulse.

* * * * *

UNITED STATES PATENT AND TRADEMARK OFFICE
CERTIFICATE OF CORRECTION

PATENT NO. : 9,847,717 B1  
APPLICATION NO. : 15/170180  
DATED : December 19, 2017  
INVENTOR(S) : Bin Shao Page 1 of 1

It is certified that error appears in the above-identified patent and that said Letters Patent is hereby corrected as shown below:

On the Title Page

In item (22), in "Filed", in Column 1, Line 1, after "2016", insert --¶(65) Prior Publication Data US 2017/0353107 A1 Dec. 7, 2017--

In the Claims

In Column 11, Line 45, in Claim 2, delete "time" and insert --timer-- therefor

Signed and Sealed this
Fourth Day of June, 2019

Andrei Iancu
*Director of the United States Patent and Trademark Office*